Feb. 17, 1931.  S. A. SNIDER  1,792,774
MOUSE TRAP
Filed Dec. 13, 1928
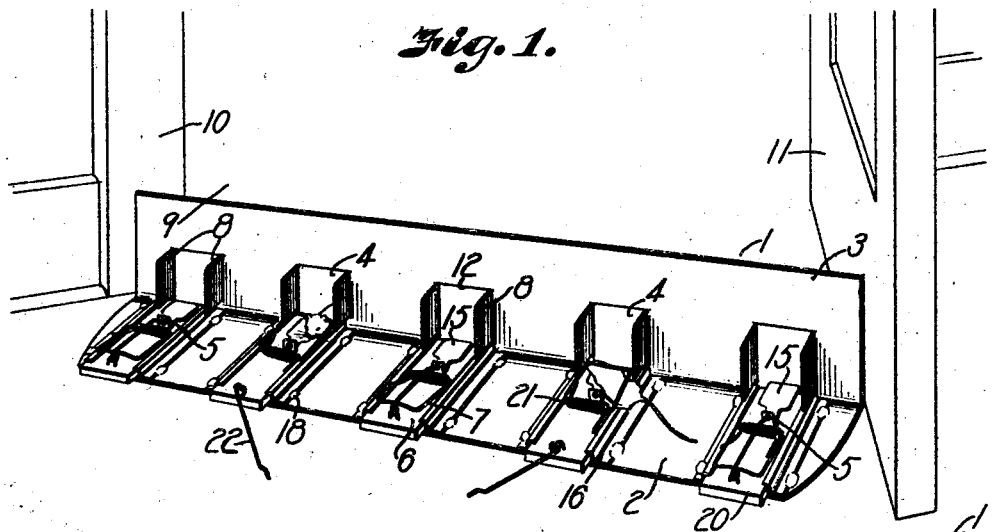
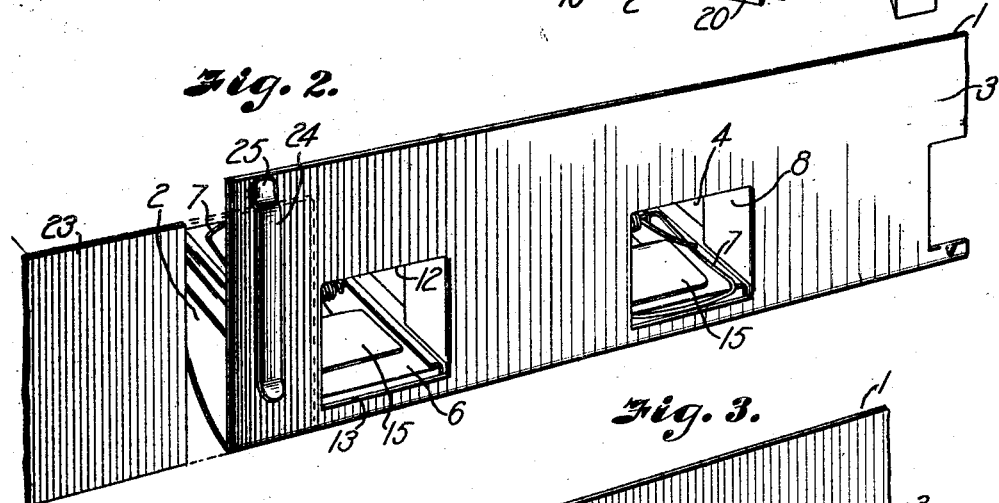
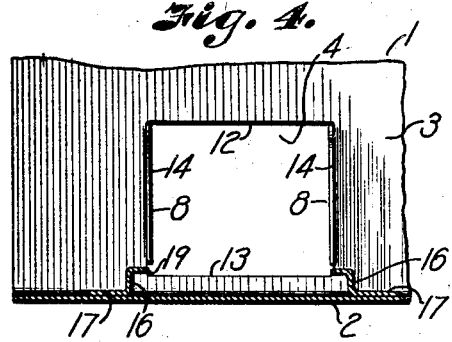
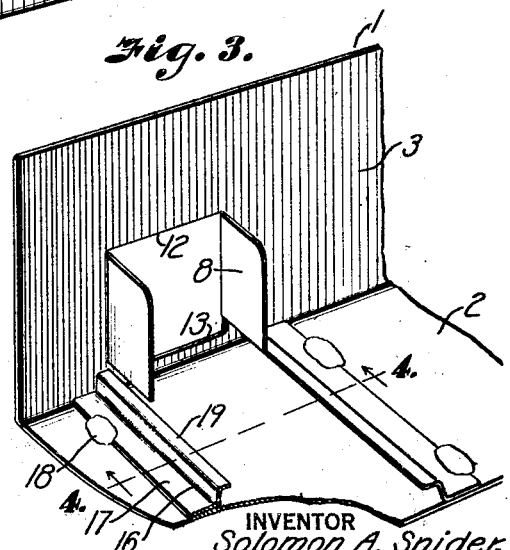
INVENTOR
Solomon A. Snider.
BY
ATTORNEY Patented Feb. 17, 1931

1,792,774

UNITED STATES PATENT OFFICE

SOLOMON A. SNIDER, OF CARBONDALE, ILLINOIS, ASSIGNOR OF FIFTY-ONE PER CENT TO GEORGE R. COOPER, OF KANSAS CITY, MISSOURI

MOUSE TRAP

Application filed December 13, 1928. Serial No. 325,846.

My invention relates to animal traps, and more particularly to traps having jaws adapted for release by the animals, the principal objects of the invention being to provide a limited passage for rodents through an opening such as a door, and mount a trap at the passage, whereby a rodent will be required to move into contact with the release mechanism of the trap upon passing through the door. Further objects are to assure the operation of the release mechanism by the rodent, to provide a trap requiring no bait to catch rodents, to mount traps removably on a support having rodent-admitting passages, to mount a plurality of traps on supports adapted for adjustment to a door opening whereby a number of rodents moving in either direction through the opening will be caught, and the capture of one rodent will not deter others from attempting to pass through the doorway.

In accomplishing these and other objects of the invention, I have provided improved details of structure, the preferred forms of which are illustrated in the accompanying drawings, wherein:

Fig. 1 is a perspective view of a trapping device constructed in accordance with my invention, and adjusted to block a door opening.

Fig. 2 is an enlarged perspective view of a portion of the device from the opposite side to that of Fig. 1, illustrating means for adjusting the length of the support to fill an opening.

Fig. 3 is an enlarged perspective view of a portion of the support illustrating the structure of rodent-guiding means and trap-engaging members.

Fig. 4 is a vertical sectional view on the line 4—4, Fig. 3.

Referring in detail to the drawings:

1 designates generally a frame formed preferably of relatively thin metal sheets, for a device for catching mice, and comprises a base plate 2 and a wall 3 erected on the base, for example at one longitudinal edge, and at a desired angle thereto and preferably vertical. The wall is provided with a plurality of apertures 4, and triggers or detents 5 of traps 6 are positioned at the apertures for releasing spring-actuated bars 7.

I provide the frame further with wings 8 at each opening, extending in the direction of the traps, and adapt the frame for positioning in a doorway or similar passage 9 with its ends engaging the vertical boundaries of the passage such as the casing 10 and an open door 11, whereby a mouse moving through the passage will pass through one of the apertures in the frame of the device, spring a trap, and be captured.

The wall 3 of the frame is preferably slit transversely on horizontal parallel lines to form the upper and lower edges 12 and 13 of the apertures 4, and then slit vertically centrally of the transverse slits to provide the vertical free edges 14 of the wings 8, the slitted portions being inbent to form the apertures and extend longitudinally of the traps for restricting the paths for the mice to prevent them from passing around the triggers and avoiding release of the trapping mechanism.

I provide a relatively broad trigger piece or tread 15 on each trigger adapted to extend substantially across an aperture in the wall of the frame whereby contact of the mouse with the trigger is assured.

I further provide guides 16 on the base plate at the openings, in which a trap may be removably mounted, and comprising strips 17 secured to the base as by welding as indicated at 18, and having offset keeper flanges 19, which may be adapted to receive the supports or bodies 20 of traps, to be moved slidably into position at the apertures.

When traps such as those illustrated are to be mounted on the frame, I preferably offset the lower slit forming the lower edge 13 of an aperture so that said edge may substantially register with the upper surface of the base of a trap, and the wooden body of the trap may be moved under the wings into engagement with the wall 3.

The bar 7 of a trap is provided with an actuating spring 21, positioned in any desired relation with the aperture to catch the mouse and suitably anchored to the frame, the bar comprising the loops or bows of spring wire in the ordinary traps. I prefer to mount the trap elements on the wooden body as shown, as in the ordinary mouse trap, the bow being anchored to the base plate 2 through the body 20, and the retaining or setting wire 22 which releasably engages the trigger being also anchored to the base plate through the body.

Means are provided for adjusting the frame 1 to the width of a passage, comprising an extension sheet indicated by 23 which may be a plain sheet of metal corresponding to the wall of the trap-supporting frame, and a resilient clip 24 having one end 25 fixed to the back of the wall 3 adjacent its upper edge, the free portion of the clip extending downwardly, whereby the extension may be moved slidably into engagement with and substantially parallel to the wall, and will be supported and latched in position by the clip.

It is apparent that the clip further provides means for latching two frames together, when one frame is telescoped over another to form an extension of the same.

In using the invention, the device is installed in a door or similar passage to block the same, and forces mice to move through the apertures of the frame into contact with the triggers of the traps. The wings at the apertures further restrict the movements of the mice, and guide them over the paths in which the released bars of the traps will move. Actuation of the triggers by the mice is further assured by the extent of the trigger leaves or treads.

Experience and use have proved that mice will pass through the frame apertures in either direction, both from the rear and from the front over the traps; and that the pressure of a captured mouse in one aperture will cause a second mouse to seek and pass through another aperture and be captured by the trap therein.

Any suitable number of frames may be associated to extend across a passage, and the lengths of the walls may be further extended and adjusted to the width of the passage or area to be trapped, for example one portion of a room, by the plane extensions. The frames and extensions may abut angularly to partly or completely enclose an area.

No bait is required for traps mounted as described on my improved frame, since the mice tread on the triggers upon passing through the apertures, and the device is therefore easily prepared for use.

The frames are constructed and equipped as described not only for effectively catching mice and for similar purposes, but to facilitate handling. A frame may be lifted and moved, and the captured mice removed without touching the traps, using a hooklike tool for lifting the bars from the captured mice to permit the mice to fall from the frame, and the device may then be sterilized, the user grasping a portion of the frame with which no mouse has come into contact.

What I claim and desire to secure by Letters Patent is:

1. A mouse-catching device comprising a base and a wall having an aperture accessible from both sides of the wall, and a trap supported by the frame and having a trigger located at the aperture.

2. A mouse-catching device comprising a vertical wall having an aperture, wings extending from the wall on each side of the aperture, means for supporting the wall, the aperture being accessible from both sides of the wall, and a trap having a trigger located at the aperture.

3. In a mouse-catching device, a base, an elongated wall member extending angularly from the base and having a plurality of apertures accessible from both sides of the wall member, trap members connected to the base and having triggers positioned at the apertures.

4. In a mouse-catching device for positioning in a passage, a frame including a base and a wall extending angularly from the base and having a plurality of apertures accessible from each side of the wall, wings outstruck from the wall to form the apertures, and a trap removably mounted on the frame at each aperture.

5. In a mouse-catching device, a base comprising a flat plate, paired keeper flanges on the plate to receive traps adapted to be slidably mounted on the base, and a wall member erected on the base and having apertures located for registering with the traps.

6. In a mouse-catching device, a base, an elongated wall member extending upwardly from the base and having a plurality of apertures accessible from both sides of the wall member, and trap members mounted on the base and having triggers including relatively broad tread members positioned at the apertures.

7. In a device of the character described including a trap having a base, a frame including a vertical wall having an aperture and a base plate provided with keeper flanges adjacent the apertures for slidably receiving and retaining the base of the trap.

In testimony whereof I affix my signature.

SOLOMON A. SNIDER.